US011350416B2

(12) United States Patent
Yang et al.

(10) Patent No.: US 11,350,416 B2
(45) Date of Patent: May 31, 2022

(54) PHYSICAL UPLINK CONTROL CHANNEL REPETITION CONFIGURATION

(71) Applicant: QUALCOMM Incorporated, San Diego, CA (US)

(72) Inventors: Wei Yang, San Diego, CA (US); Wanshi Chen, San Diego, CA (US); Seyedkianoush Hosseini, San Diego, CA (US); Yi Huang, San Diego, CA (US); Jing Jiang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 248 days.

(21) Appl. No.: 16/511,851

(22) Filed: Jul. 15, 2019

(65) Prior Publication Data

US 2020/0029335 A1 Jan. 23, 2020

Related U.S. Application Data

(60) Provisional application No. 62/701,119, filed on Jul. 20, 2018.

(51) Int. Cl.
| | | |
|---|---|---|
| H04W 72/04 | (2009.01) | |
| H04L 1/00 | (2006.01) | |
| H04W 52/36 | (2009.01) | |
| H04L 5/00 | (2006.01) | |
| H04L 1/18 | (2006.01) | |

(52) U.S. Cl.
CPC ....... *H04W 72/0473* (2013.01); *H04L 1/0026* (2013.01); *H04L 1/1858* (2013.01); *H04L 5/0055* (2013.01); *H04W 52/36* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 2014/0092865 A1* | 4/2014 | Heo | H04W 28/0268 370/331 |
| 2016/0242169 A1* | 8/2016 | Park | H04L 1/1812 |
| 2017/0026958 A1* | 1/2017 | Noh | H04W 72/0413 |
| 2018/0213484 A1 | 7/2018 | Oh et al. | |

(Continued)

FOREIGN PATENT DOCUMENTS

| | | |
|---|---|---|
| WO | 2017014510 A1 | 1/2017 |

OTHER PUBLICATIONS

Partial International Search Report—PCT/US2019/042018—ISA/EPO—dated Oct. 17, 2019.

(Continued)

*Primary Examiner* — Shripal K Khajuria
(74) *Attorney, Agent, or Firm* — Harrity & Harrity, LLP

(57) ABSTRACT

Various aspects of the present disclosure generally relate to wireless communication. In some aspects, a user equipment may determine, based at least in part on a downlink control information message associated with indicating a physical uplink control channel resource configuration, a physical uplink control channel repetition parameter. The user equipment may transmit a set of transmissions of a physical uplink control channel based at least in part on the physical uplink control channel repetition parameter. Numerous other aspects are provided.

48 Claims, 11 Drawing Sheets

(56) References Cited

U.S. PATENT DOCUMENTS

2019/0191382 A1* 6/2019 Zhang .................. H04W 52/14

OTHER PUBLICATIONS

ZTE: "Remaining Issues on PUCCH for MTC Enhancement," 3GPP Draft; R1-156665 PUCCH, 3rd Generation Partnership Project (3GPP), Mobile Competence Centre; 650, Route Des Lucioles; F-06921 Sophia-Antipolis Cedex; France, vol. RAN WG1, No. Anaheim, US; Nov. 15, 2015-Nov. 22, 2015, Nov. 15, 2015, XP051003064, 6 Pages, Retrieved from the Internet: URL: http://www.3gpp.org/ftp/Meetings_3GPP_SYNC/RAN1/Docs/ [retrieved on Nov. 15, 2015] section 3, 4.
International Search Report and Written Opinion—PCT/US2019/042018—ISA/EPO—dated Jan. 17, 2020.

* cited by examiner

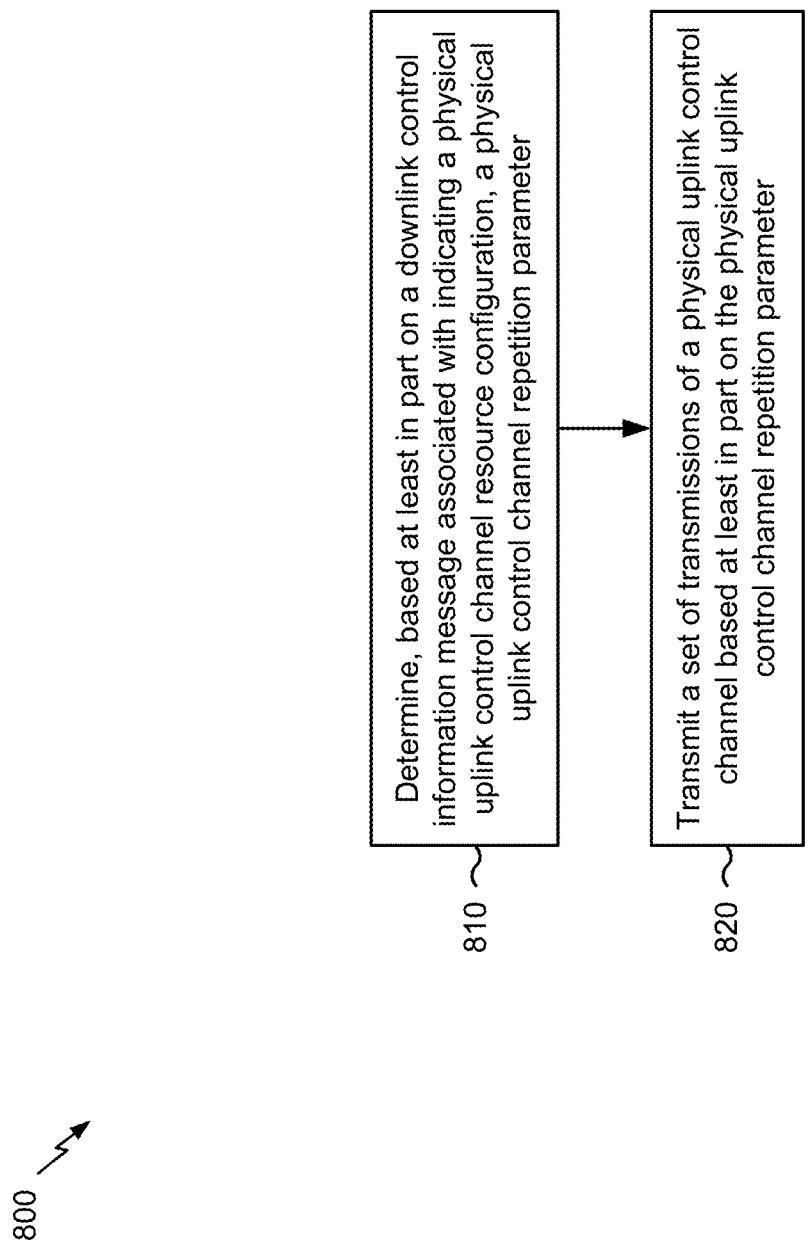

PHYSICAL UPLINK CONTROL CHANNEL REPETITION CONFIGURATION

CROSS-REFERENCE TO RELATED APPLICATIONS UNDER 35 U.S.C. § 119

This application claims priority to U.S. Provisional Patent Application No. 62/701,119, filed on Jul. 20, 2018, entitled "PHYSICAL UPLINK CONTROL CHANNEL REPETITION CONFIGURATION," which is hereby expressly incorporated by reference herein.

FIELD OF THE DISCLOSURE

Aspects of the present disclosure generally relate to wireless communication, and to techniques and apparatuses for physical uplink control channel repetition configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include determining, based at least in part on a downlink control information message associated with indicating a physical uplink control channel resource configuration, a physical uplink control channel repetition parameter; and transmitting a set of transmissions of a physical uplink control channel based at least in part on the physical uplink control channel repetition parameter.

In some aspects, a user equipment for wireless communication may include memory and one or more processors operatively coupled to the memory. The memory and the one or more processors may be configured to determine, based at least in part on a downlink control information message associated with indicating a physical uplink control channel resource configuration, a physical uplink control channel repetition parameter; and transmit a set of transmissions of a physical uplink control channel based at least in part on the physical uplink control channel repetition parameter.

In some aspects, a method of wireless communication, performed by a base station, may include transmitting a downlink control information message associated with indicating a physical uplink control channel resource configuration identifying a physical uplink control channel repetition parameter; and receiving a set of transmissions of a physical uplink control channel in accordance with the physical uplink control channel repetition parameter.

In some aspects, a base station for wireless communication may include memory and one or more processors operatively coupled to the memory. The memory and the one or more processors may be configured to transmit a downlink control information message associated with indicating a physical uplink control channel resource configuration identifying a physical uplink control channel repetition parameter; and receive a set of transmissions of a physical uplink control channel in accordance with the physical uplink control channel repetition parameter.

In some aspects, a non-transitory computer-readable medium may store one or more instructions for wireless communication. The one or more instructions, when executed by one or more processors of a base station, may cause the one or more processors to determine, based at least in part on a downlink control information message associated with indicating a physical uplink control channel resource configuration, a physical uplink control channel repetition parameter; and transmit a set of transmissions of a physical uplink control channel based at least in part on the physical uplink control channel repetition parameter.

In some aspects, a non-transitory computer-readable medium may store one or more instructions for wireless communication. The one or more instructions, when executed by one or more processors of a base station, may cause the one or more processors to transmit a downlink control information message associated with indicating a physical uplink control channel resource configuration identifying a physical uplink control channel repetition parameter; and receive a set of transmissions of a physical uplink control channel in accordance with the physical uplink control channel repetition parameter.

In some aspects, an apparatus for wireless communication may include means for determining, based at least in part on a downlink control information message associated with indicating a physical uplink control channel resource configuration, a physical uplink control channel repetition parameter; and means for transmitting a set of transmissions of a physical uplink control channel based at least in part on the physical uplink control channel repetition parameter.

In some aspects, an apparatus for wireless communication may include means for transmitting a downlink control information message associated with indicating a physical uplink control channel resource configuration identifying a physical uplink control channel repetition parameter; and means for receiving a set of transmissions of a physical uplink control channel in accordance with the physical uplink control channel repetition parameter.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
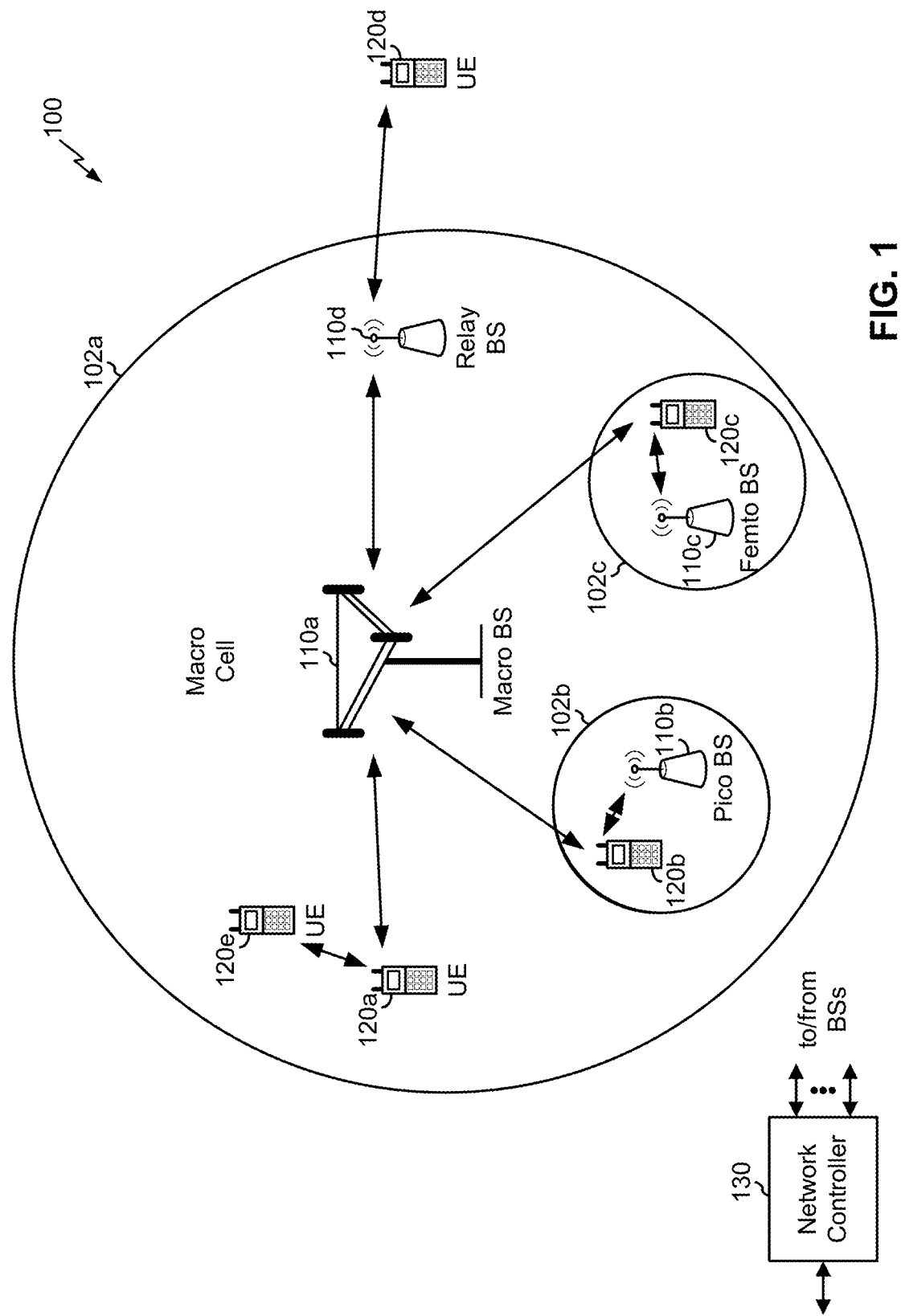
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
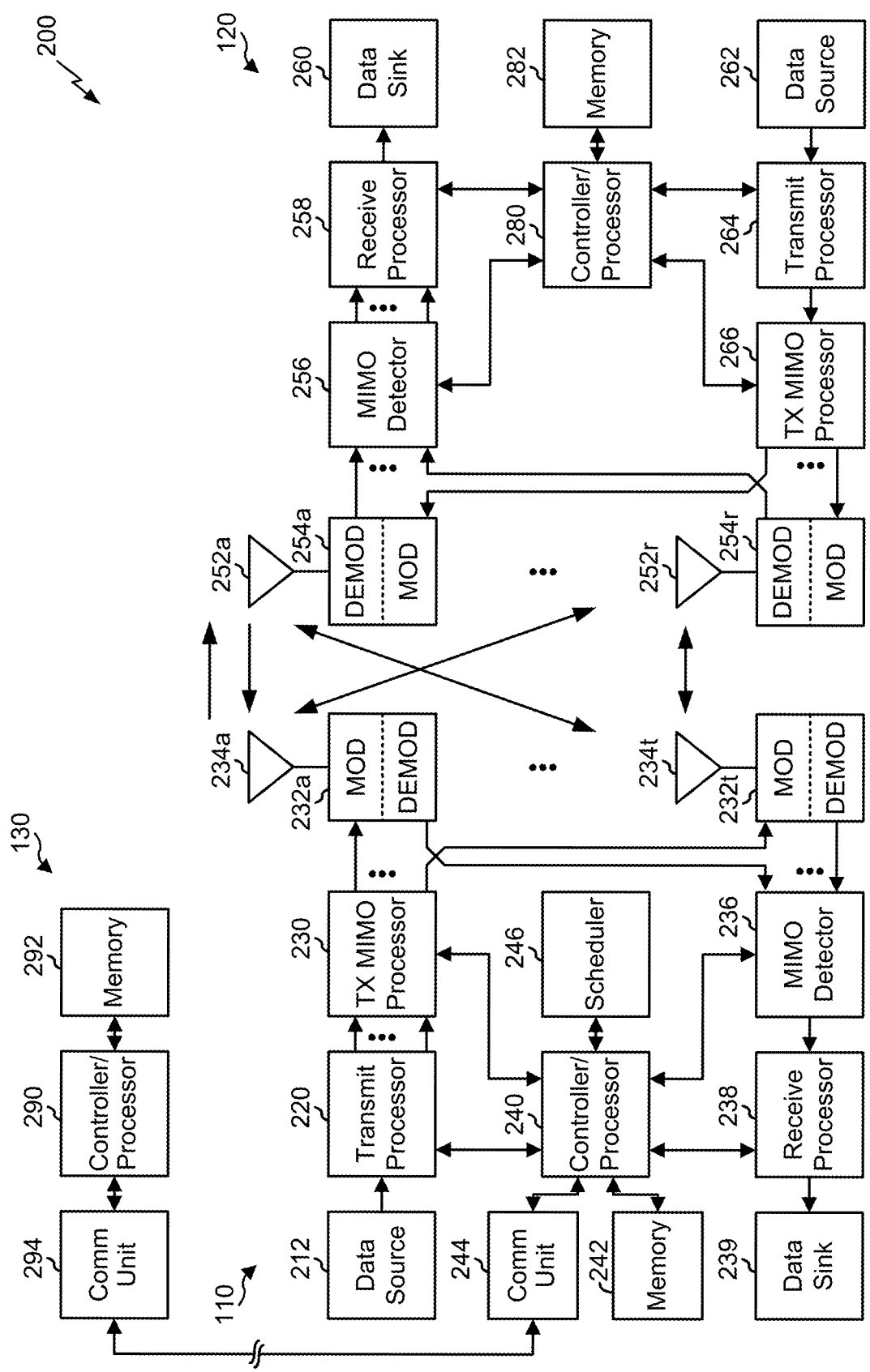
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical uplink control channel configuration, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining, based at least in part on a downlink control information message associated with indicating a physical uplink control channel resource configuration, a physical uplink control channel repetition parameter, means for transmitting a set of transmissions of a physical uplink control channel based at least in part on the physical uplink control channel repetition parameter, and/or the like. In some aspects, such means may include one or more components of UE 120 described in connection with FIG. 2.

In some aspects, BS 110 may include means for transmitting a downlink control information message associated with indicating a physical uplink control channel resource configuration identifying a physical uplink control channel repetition parameter, means for receiving a set of transmissions of a physical uplink control channel based at least in part on the physical uplink control channel repetition parameter, and/or the like. In some aspects, such means may include one or more components of BS 110 described in connection with FIG. 2.

As indicated above, FIG. 2 is provided merely as an example. Other examples may differ from what is described with regard to FIG. 2.

Figure 3A:
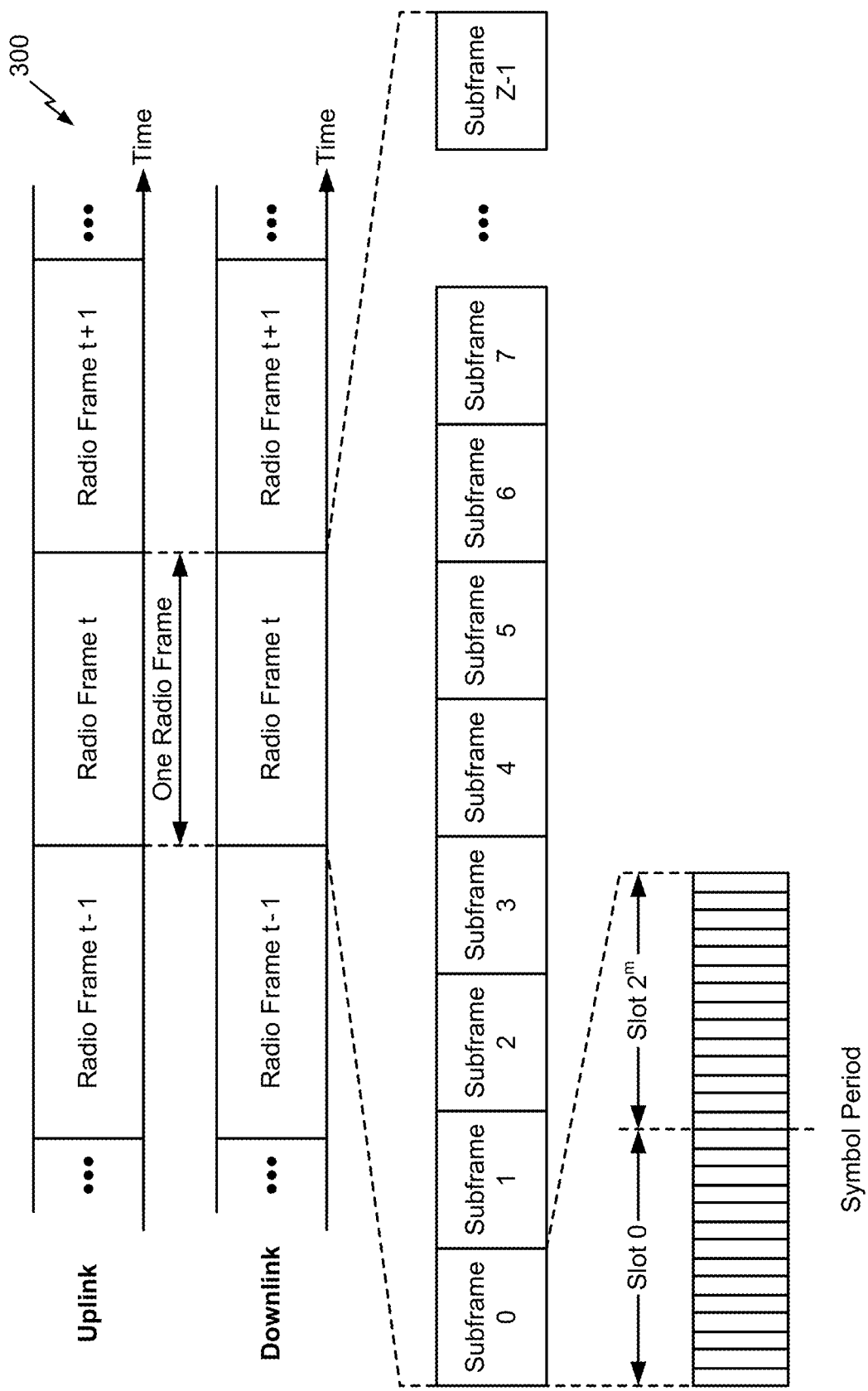
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
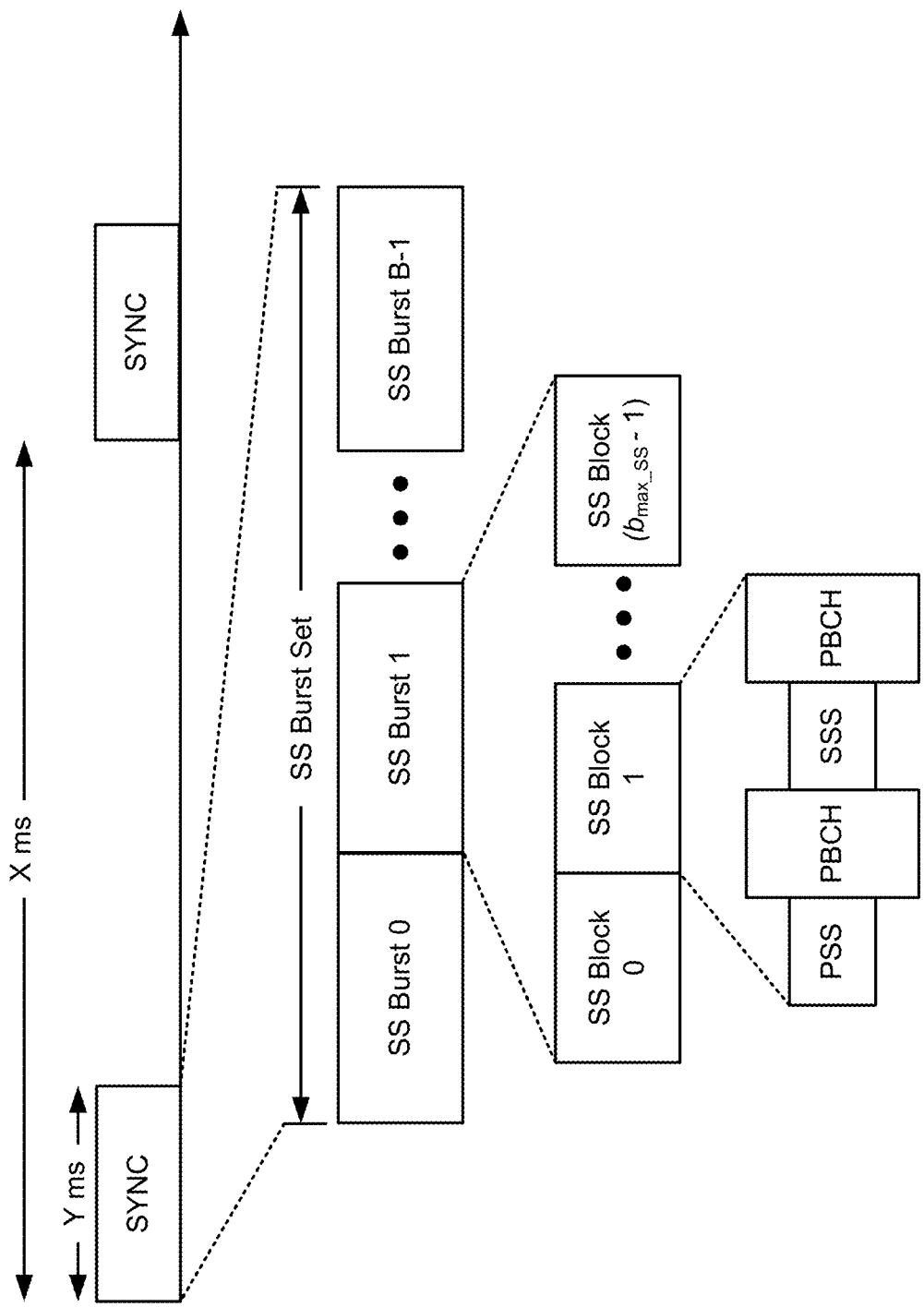
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
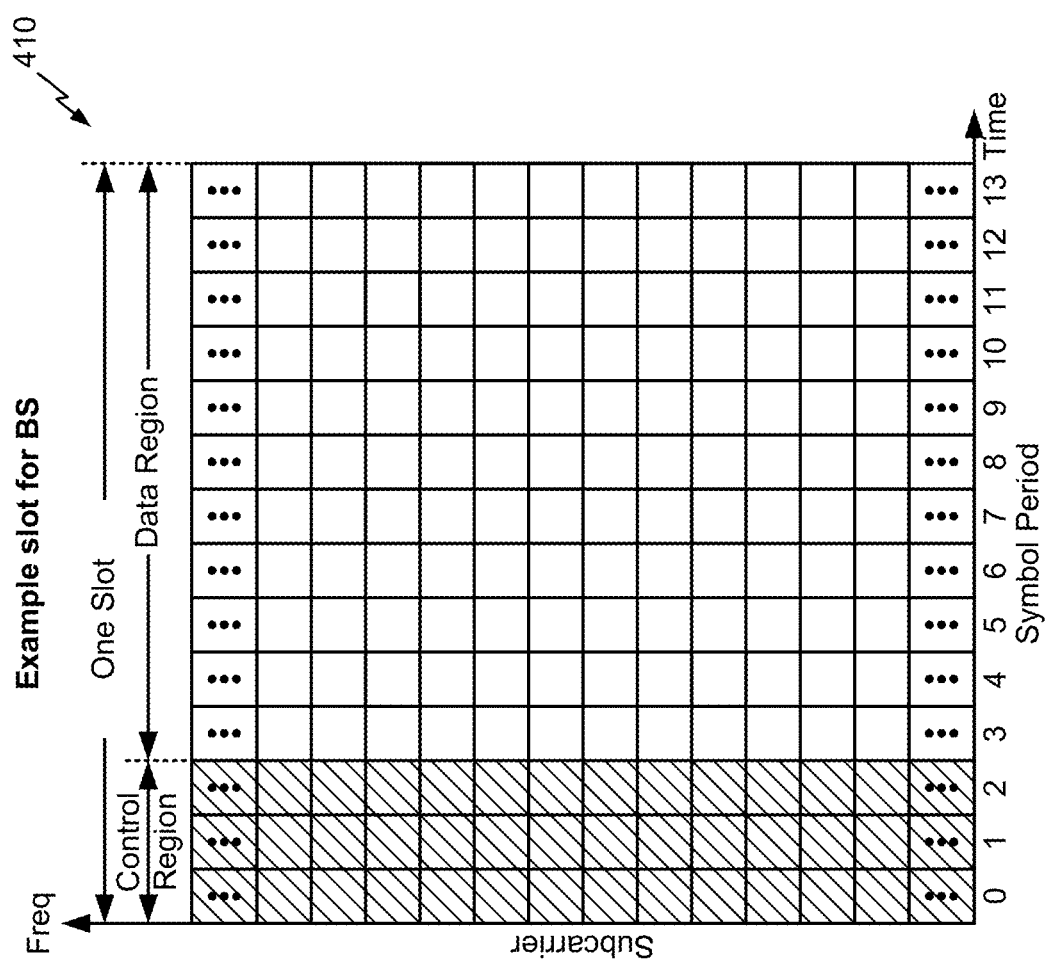
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
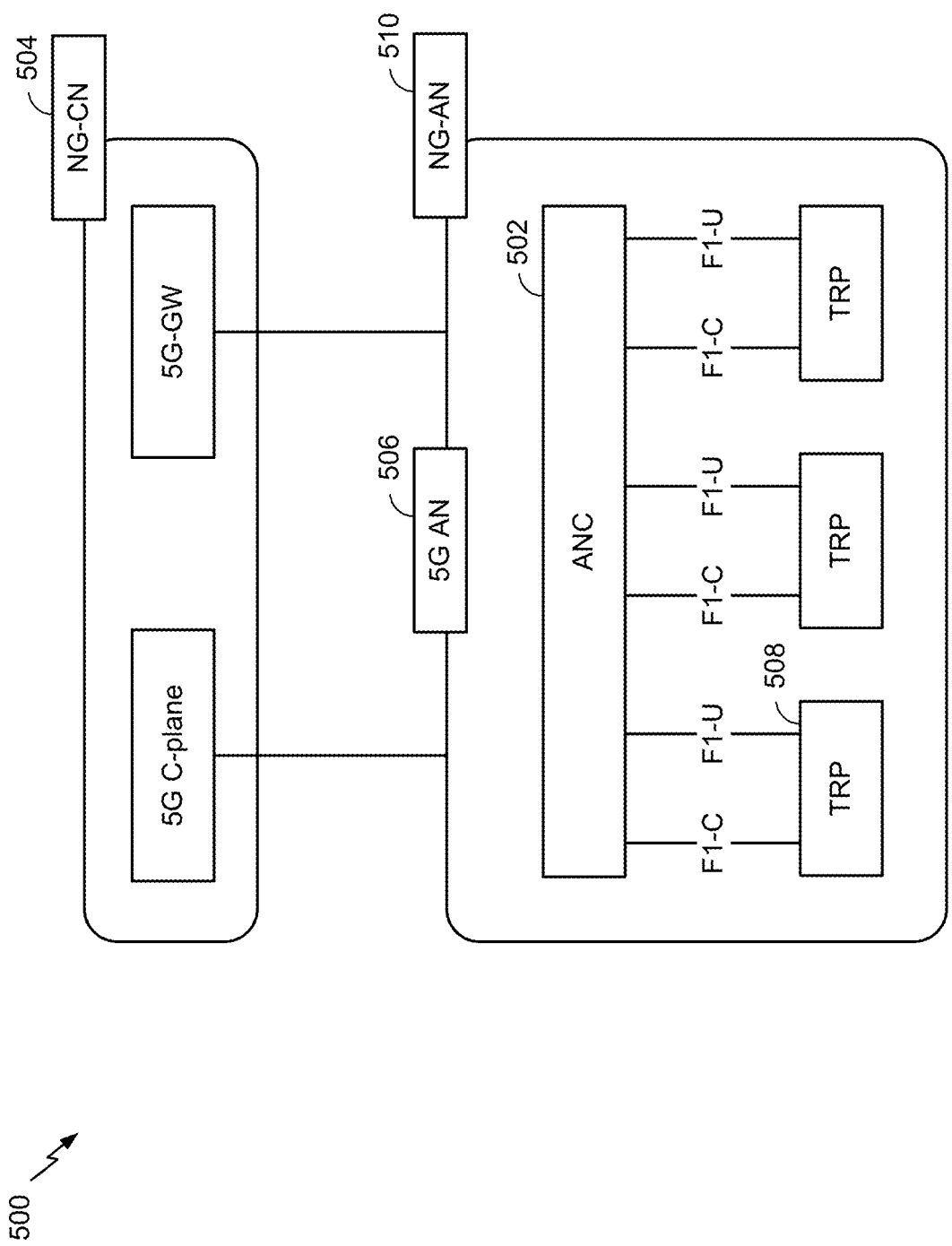
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
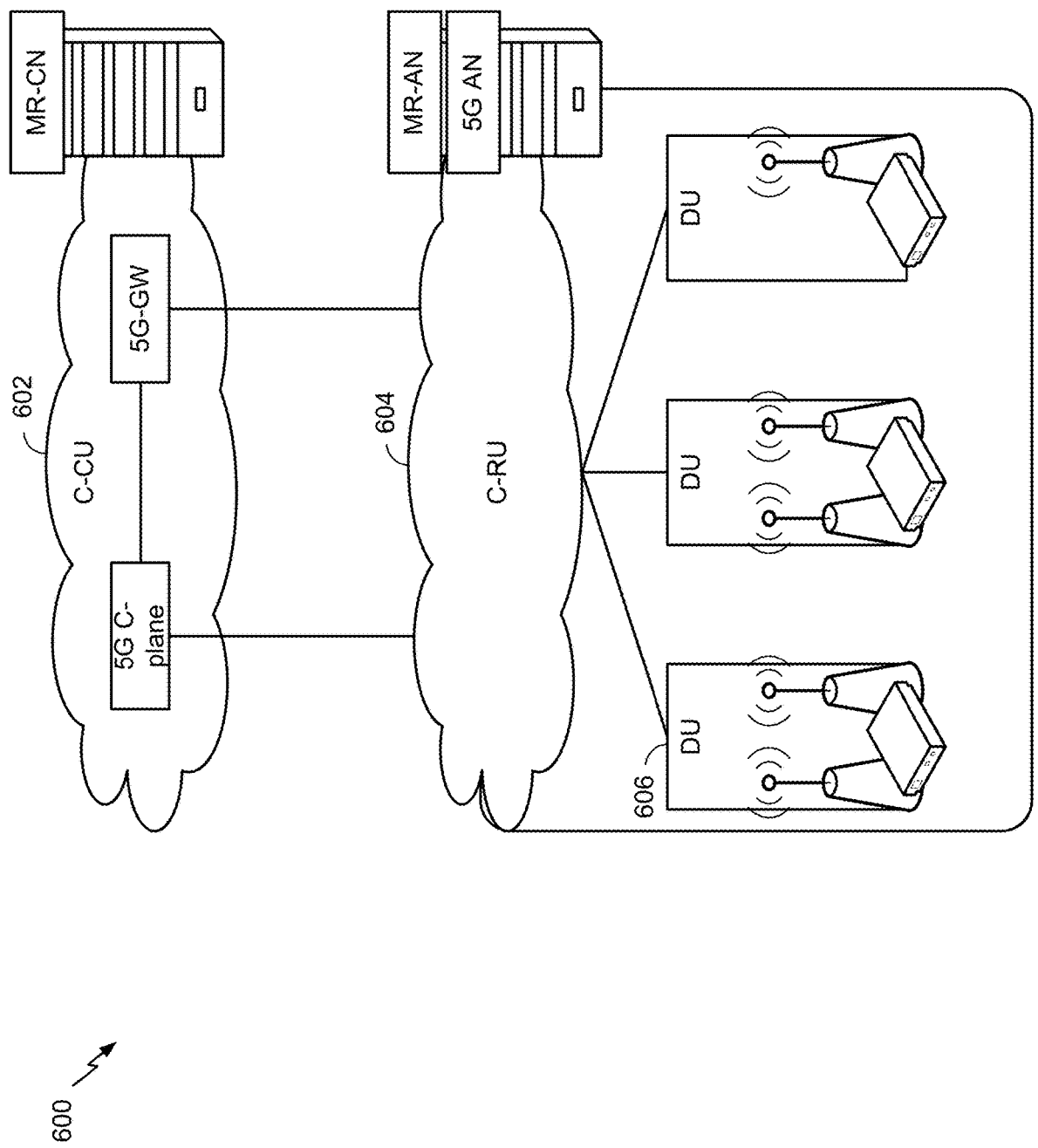
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In some communications systems, such as NR, a physical uplink control channel (PUCCH) resource may be indicated using a downlink control information (DCI) message. For example, a UE may receive a DCI from a BS, and may determine time resources, frequency resources, code domain resources, and/or the like for a PUCCH transmission based at least in part on the DCI. Additionally, or alternatively, the UE may receive another message associated with configuring a PUCCH repetition parameter. For example, the UE may receive a radio resource control (RRC) message associated with indicating a quantity of repetitions of the PUCCH transmission that the UE is to transmit to ensure that, for a set of channel conditions, a reliability criterion is satisfied, a latency criterion is satisfied, and/or the like. As another example, the UE may receive an indication message associated with switching a PUCCH format, and may determine a quantity of repetitions for a PUCCH when switching the PUCCH format.

However, semi-statically configuring the PUCCH repetition parameter using an RRC message or upon switching a PUCCH format may result in a threshold period of time elapsing to alter the PUCCH repetition parameter during operation. For example, alteration of the PUCCH repetition parameter may be delayed based at least in part on a dynamic queuing delay associated with a scheduler of a BS, an availability of resources for an RRC message, a processing time before the configuration in an RRC message takes effect, and/or the like. As a result, the PUCCH repetition parameter may not be optimized for current channel conditions. Some aspects described herein may enable PUCCH repetition parameter signaling using PUCCH resource configuration signaling. For example, the UE may receive a DCI associated with indicating a PUCCH resource configuration, and may determine the PUCCH repetition parameter based at least in part on the DCI.

In some aspects, the UE may determine that a first PUCCH resource configuration (e.g., resource configuration 0) includes a first PUCCH repetition parameter (e.g., 2 repetitions), and that a second PUCCH resource configuration (e.g., resource configuration 6) includes a second PUCCH repetition parameter (e.g., 4 repetitions). In some aspects, the UE may determine a bit indicator field in the PUCCH resource configuration that identifies the PUCCH repetition parameter. In some aspects, the UE may determine other information using the DCI message indicating the PUCCH resource configuration, such as a transmit power configuration, a collision response action, and/or the like. In this way, the UE reduces an amount of time, a usage of network resources, and/or the like to configure a PUCCH repetition parameter, thereby improving network performance.

Figure 7A:
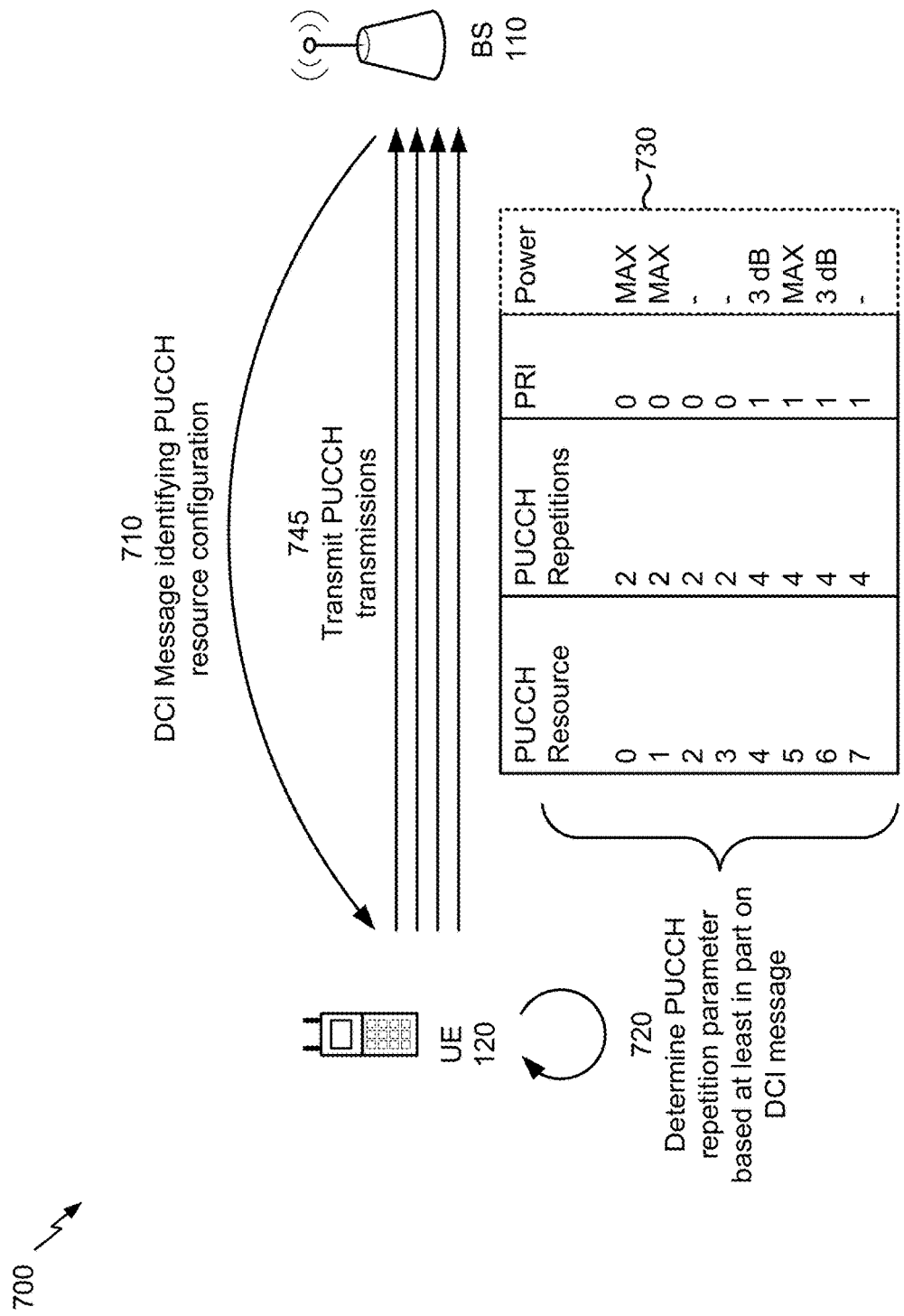
FIGS. 7A and 7B are diagrams illustrating an example of physical uplink control channel repetition configuration, in accordance with various aspects of the present disclosure.
Figure 7B:
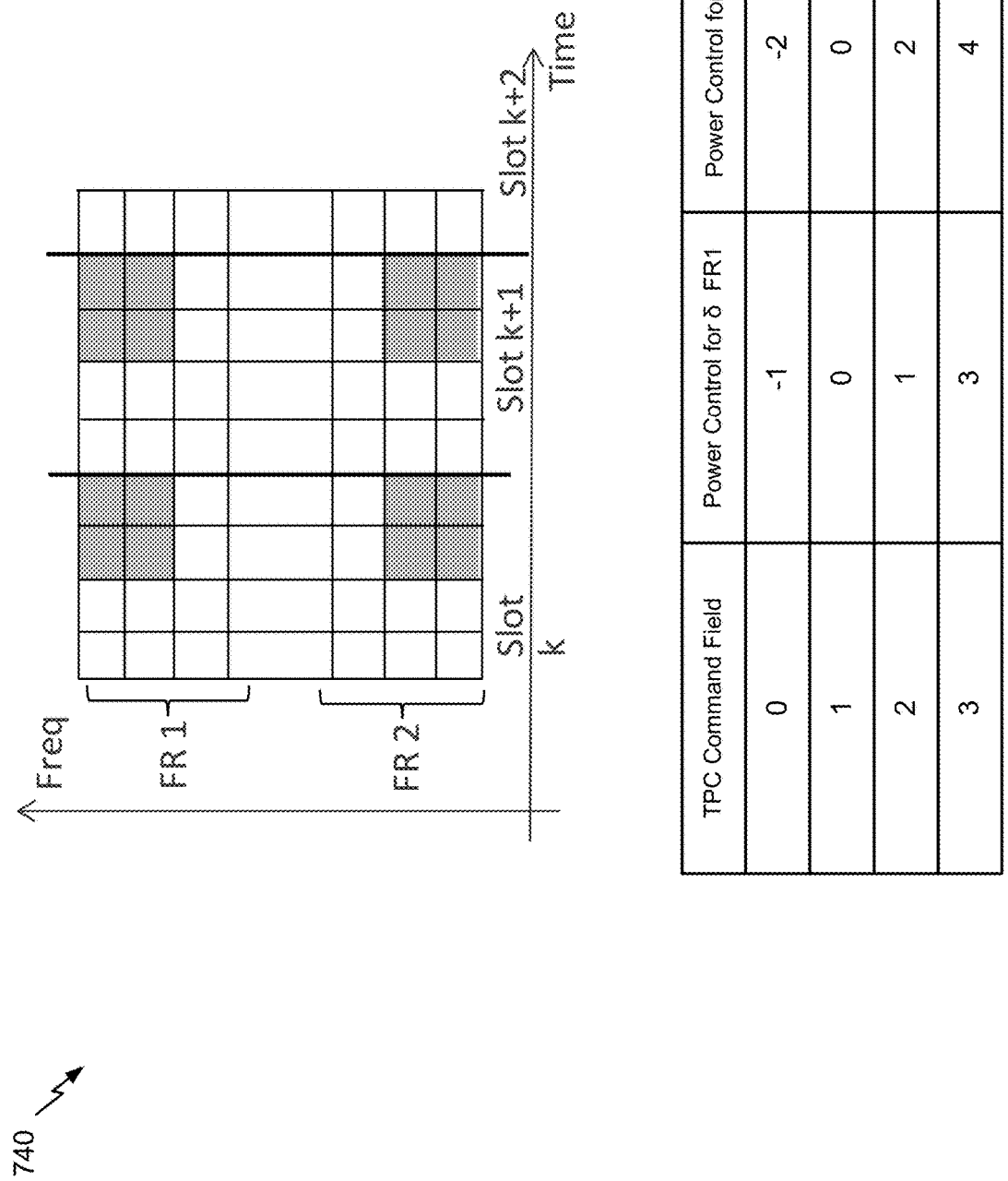

FIGS. 7A and 7B are diagrams illustrating an example 700 of physical uplink control channel repetition configuration, in accordance with various aspects of the present disclosure. As shown in FIG. 7A, example 700 includes a BS 110 and a UE 120.

As further shown in FIG. 7A, and by reference number 710, UE 120 may receive, from BS 110, a DCI message identifying a PUCCH resource configuration. For example, UE 120 may receive information identifying a particular PUCCH resource configuration (e.g., that UE 120 is to use PUCCH resource 0) associated with a particular time resource, frequency resource, code domain resource, PUCCH format, and/or the like for PUCCH transmission.

As further shown in FIG. 7A, and by reference number 720, UE 120 may determine, based at least in part on the DCI message, a PUCCH repetition parameter. For example, for a particular PUCCH resource configuration (e.g., to use PUCCH resource 0, 1, 2, 3, and/or the like), UE 120 may determine a particular quantity of repetitions (e.g., 2 repetitions, 4 repetitions, 8 repetitions, and/or the like), as shown by reference number 730. For example, in this case, UE 120 may determine a table identifying PUCCH resource parameters, PUCCH repetition parameters, and physical uplink control channel resource indicator (PRI) parameters based at least in part on RRC signaling. Then, based at least in part on receiving the DCI message, which identifies a PM value, UE 120 may use the table to identify a corresponding PUCCH resource parameter, a corresponding PUCCH repetition parameter, a group of corresponding PUCCH resource parameters, a group of corresponding PUCCH repetition parameters, and/or the like. In this way, UE 120 determines a PUCCH repetition configuration using signaling for a PUCCH resource configuration, thereby improving network performance.

In some aspects, UE 120 may determine the PUCCH repetition parameter based at least in part on a bit indicator field (e.g., a PUCCH repetition indicator field) included in the DCI message, and UE 120 may determine that the DCI message indicates that the UE is to transmit a particular quantity of PUCCH transmissions (e.g., repetitions) based at least in part on the bit indicator field. In this case, the bit indicator field may be used for a downlink scheduling DCI scheduling an acknowledgement or negative acknowledgement transmission, an uplink or downlink scheduling DCI triggering an aperiodic channel state information (A-CSI) message, and/or the like.

In some aspects, UE 120 may determine a resource indicator value based at least in part on the DCI message. For example, the DCI message may include a PRI field, as shown in the table of FIG. 7A, and as discussed above. In another case, an acknowledgement resource indicator (ARI) may be used. In some aspects, each PUCCH resource with a common PRI field value (e.g., 0, 1, and/or the like) may be associated with a common value for the PUCCH repetition parameter (e.g., 2, 4, and/or the like, respectively). For example, the PRI field value in the DCI may indicate the group of PUCCH resources that correspond to the corresponding PRI field value. In some aspects, a PUCCH resource within the group of PUCCH resources that correspond to the signaled PM field value may be indicated to UE 120 via an implicit mapping method. For example, a starting control channel element (CCE) of a PDCCH carrying the DCI may be used by UE 120 to determine the PUCCH resource to use within the group of PUCCH resources that correspond to the signaled PM field value. In this way, the PUCCH repetition parameter (e.g., 2, 4, and/or the like, respectively) is determined based on the PRI field value in the DCI, but, for example, not based at least in part on the starting CCE of the PDCCH.

In some aspects, UE 120 may determine a power indicator value based at least in part on the DCI message and/or the PUCCH resource configuration. For example, another parameter (e.g., in the table shown in FIG. 7A) may be configured, and UE 120 may use the power indicator value to determine a table entry identifying a configuration for a transmit power. In this case, the transmit power may indicate a maximum transmit power (e.g., that a maximum transmit power is to be used), a power increase parameter (e.g., that a particular power increase, such as 3 decibels (dB) is to be applied to a PUCCH transmitted using a signaled PUCCH resource), an empty field (e.g., indicating no alteration to a transmit power), and/or the like. In some aspects, the PUCCH resource indicator (PRI) may be used to indicate the power indicator value. For example, as shown in the table in FIG. 7A, each PUCCH resource configuration (e.g., a row entry in the table shown in FIG. 7A) may comprises an additional parameter which identifies the transmit power. In this case, the UE may determine both the PUCCH resource and the transmit power for the PUCCH transmission based on the PRI in the DCI message. In some aspects, the power change indicated by the power indicator may apply only to the set of PUCCH transmissions scheduled by the corresponding DCI message, and not to one or more subsequent PUCCH transmissions scheduled by another DCI message.

In some aspects, UE 120 may determine an implicitly signaled power indicator value. For example, UE 120 may determine a PUCCH resource configuration based at least in part on the PM field value. Based at least in part on the PUCCH resource configuration, UE 120 may determine a value of a power indicator associated with the PUCCH resource configuration, thereby enabling BS 110 to implicitly signal the power indicator by signaling the PUCCH resource configuration, rather than the BS 110 including explicitly information in the DCI to signal the power indicator.

Additionally, or alternatively, UE 120 may determine a transmit power command (TPC) included in the DCI message and indicating a maximum transmit power for a transmission of the PUCCH, and may determine to transmit using a transmit power determined based at least in part on the maximum transmit power. In some aspects, UE 120 may perform carrier-specific power control. For example, UE 120 may determine carrier-specific path-losses, may determine carrier-specific power values (e.g., using a single TPC command), and/or the like. In some aspects, UE 120 may determine a power offset based at least in part on the TPC. For example, UE 120 may transmit PUCCH on different frequency ranges (e.g., a first frequency range and a second frequency range), and may determine a set of power offsets for the set of component carriers to transmit the PUCCH on the different frequency ranges.

In some aspects, UE 120 may determine to transmit the PUCCH using a common resource in each slot. For example, UE 120 may determine to use a particular frequency resource and a particular time resource of each slot for transmitting the PUCCH based at least in part on the DCI. In some aspects, UE 120 may determine to transmit the PUCCH using a different resource in different slots. For example, in a first slot, UE 120 may determine a first frequency resource and/or a first time resource, and in a second slot, UE 120 may determine a second frequency resource and/or a second time resource that are different than the first frequency resource and/or the first time resource. In this case, UE 120 may determine the first frequency resource, the first time resource, the second frequency resource, the second time resource based at least in part on the PUCCH resource configuration (e.g., the PUCCH resource configuration may include information identifying frequency and/or time resources).

In some aspects, UE 120 may be configured with an association between PUCCH resources in different component carriers. For example, UE 120 may determine a PUCCH resource in a first component carrier or frequency range, and may, therefrom, determine a corresponding PUCCH resource in a second component carrier or frequency range based on the association. In this case, UE 120 may receive signaling identifying the PUCCH resource in the first component carrier or frequency range, and may use an association between the first component carrier or frequency range and the second component carrier or frequency range to determine the PUCCH resource in the second component carrier or frequency range (e.g., without explicit signaling). In some aspects, UE 120 may receive signaling configuring associations between PUCCH resources in different component carriers or frequency ranges.

In some aspects, UE 120 may determine to use different component carriers for different repetitions based at least in part on the PUCCH configuration. For example, UE 120 may be configured with a first PUCCH resource in a first component carrier and a second PUCCH resource in a second component carrier for a first slot, and may be configured with a third PUCCH resource in the first component carrier and a fourth PUCCH resource in the second component carrier for a second slot. In some aspects, the different component carriers may be associated with different frequency bands. For example, as shown in FIG. 7B, and by diagram 740, UE 120 may use a first component carrier in a first frequency range (e.g., a non-mmW frequency range, FR1, such as a frequency range less than 6 GHz) and a second component carrier in a second frequency range (e.g., an mmW frequency range, FR2, such as a frequency range between 20 GHz and 40 GHz). In some aspects, another repetition parameter may be configured to cause repetition of PUCCH transmissions on both the first component carrier and the second component carrier. In this case, as shown in diagram 740, PUCCH transmission may occur in slot k, and may subsequently occur in slots k+1 and k+2 if the repetition parameter is greater than 1. If the repetition parameter is not greater than 1, than the PUCCH transmission may only occur in slot k. In some aspects, transmit powers of, for example, FR1 and FR2 may be configured based on fields in the table shown in FIG. 7A. For example, UE 120 may receive an indicator indicating a field value for determining respective transmit powers for the respective component carriers.

In some aspects, UE 120 may transmit the repetitions of the PUCCH using the four PUCCH resources. In some aspects, UE 120 may determine transmit powers for the PUCCH transmissions on each component carrier. For example, UE 120 may perform a path loss determination for each component carrier, and may determine a power offset from a maximum transmit power identified by a TPC of the DCI message for each component carrier based at least in part on the path loss determination.

In some aspects, UE 120 may use a common set of preconfigured values, such as a common power control table for determining transmit powers for each component carrier. For example, UE 120 may determine a particular TPC value, and may determine transmit powers for each component carrier based at least in part on the particular TPC value. Additionally, or alternatively, UE 120 may use a plurality of sets of preconfigured values. For example, UE 120 may use a first power control table for a first component carrier, and may use a second power control table for a second component carrier, as further shown in FIG. 7B. In this case, UE 120 may determine transmit powers for the first component carrier and the second component carrier based at least in part on respective power control tables and the particular TPC value. In some aspects, when a total scheduled transmit power of concurrent PUCCH transmissions on different component carriers exceeds a maximum transmit power threshold of UE 120, UE 120 may scale each component carrier transmit power equally rather than based at least in part on a component carrier prioritization to satisfy the maximum transmit power threshold of UE 120.

In some aspects, UE 120 may determine a collision response action based at least in part on the DCI message. For example, based at least in part on detecting that a collision is to occur for repetitions of the PUCCH and a second uplink control information (UCI) message transmission, and based at least in part on determining that the PUCCH is associated with scheduling an acknowledgement or negative acknowledgement message, UE 120 may determine to drop transmission of the second UCI message, thereby ensuring that the repetitions of the PUCCH are transmitted. In some aspects, UE 120 may determine the collision response action based at least in part on a quantity of repetitions of the PUCCH. For example, UE 120 may determine to drop the second UCI message transmission based at least in part on a repetition quantity of the PUCCH being greater than 1. In this way, UE 120 avoids dropping the second UCI message entirely when the PUCCH transmission is only associated with a single transmission. In such a case, UE 120 may multiplex an acknowledgement or negative acknowledgement message with the second UCI message.

Additionally, or alternatively, UE 120 may determine to drop reception of a physical downlink shared message (PDSCH) that is to occur before UE 120 is finished transmitting the repetitions of the PUCCH.

As further shown in FIG. 7A, and by reference number 745, UE 120 may transmit the PUCCH repetitions. For example, based at least in part on determining the PUCCH repetition parameter identifying a quantity of PUCCH transmissions, UE 120 may transmit the quantity of PUCCH transmissions. In this case, for the PUCCH transmissions, UE 120 may use a particular set of transmit powers, a particular set of resources, a particular set of component carriers, and/or the like determined based at least in part on the DCI message.

As indicated above, FIGS. 7A and 7B are provided as an example. Other examples may differ from what is described with respect to FIGS. 7A and 7B.

FIG. 8 is a diagram illustrating an example process 800 performed, for example, by a UE, in accordance with various aspects of the present disclosure. Example process 800 is an example where a UE (e.g., UE 120 and/or the like) performs operations associated with physical uplink control channel repetition configuration.

As shown in FIG. 8, in some aspects, process 800 may include determining, based at least in part on a downlink control information message associated with indicating a physical uplink control channel resource configuration, a physical uplink control channel repetition parameter (block 810). For example, the UE (e.g., using receive processor 258, transmit processor 264, controller/processor 280, memory 282, and/or the like) may determine, based at least in part on a downlink control information message associated with indicating a physical uplink control channel resource configuration, a physical uplink control channel repetition parameter, as described above.

As further shown in FIG. 8, in some aspects, process 800 may include transmitting a set of transmissions of a physical uplink control channel based at least in part on the physical uplink control channel repetition parameter (block 820). For example, the UE (e.g., using receive processor 258, transmit processor 264, controller/processor 280, memory 282, and/or the like) may transmit a set of transmissions of a physical uplink control channel based at least in part on the physical uplink control channel repetition parameter, as described above.

Process 800 may include additional aspects, such as any single aspect or any combination of aspects described below and/or in connection with one or more other processes described elsewhere herein.

With respect to process 800, in a first aspect, the physical uplink control channel resource configuration includes the physical uplink control channel repetition parameter.

With respect to process 800, in a second aspect, alone or in combination with the first aspect, the physical uplink control channel resource configuration includes information identifying at least one of a time resource, a frequency resource, or a code domain resource.

With respect to process 800, in a third aspect, alone or in combination with one or more of the first and second aspects, the physical uplink control channel repetition parameter identifies a quantity of transmissions of the physical uplink control channel that the user equipment is to transmit.

With respect to process 800, in a fourth aspect, alone or in combination with one or more of the first through third aspects, the user equipment is configured to transmit the set of transmissions using a common resource set across a plurality of slots.

With respect to process 800, in a fifth aspect, alone or in combination with one or more of the first through fourth aspects, the user equipment is configured to transmit the set of transmissions using a first resource set in a first slot and a second resource set that is different from the first resource set in a second slot.

With respect to process 800, in a sixth aspect, alone or in combination with one or more of the first through fifth aspects, the user equipment is configured to determine a power indicator based at least in part on the physical uplink control channel resource configuration.

With respect to process 800, in a seventh aspect, alone or in combination with one or more of the first through sixth aspects, the power indicator indicates that the user equipment is to use a maximum power or apply a power increase to a determined power.

With respect to process 800, in an eighth aspect, alone or in combination with one or more of the first through seventh aspects, the power indicator relates to the set of transmissions and not to one or more subsequent transmissions signaled by another downlink control information message.

With respect to process 800, in a ninth aspect, alone or in combination with one or more of the first through eighth aspects, the power indicator is determined based at least in part on the downlink control information message.

With respect to process 800, in a tenth aspect, alone or in combination with one or more of the first through ninth aspects, a first transmission, of the set of transmissions, is associated with a first component carrier or frequency range and a second transmission, of the set of transmissions, is associated with a second component carrier or frequency range that is different than the first component carrier or frequency range.

With respect to process 800, in an eleventh aspect, alone or in combination with one or more of the first through tenth aspects, the user equipment is configured to determine a plurality of transmit powers for a plurality of component carriers or frequency ranges for the set of transmissions based at least in part on a transmit power command included in the downlink control information message.

With respect to process 800, in a twelfth aspect, alone or in combination with one or more of the first through eleventh aspects, the user equipment is configured to determine the plurality of transmit powers based at least in part on a plurality of path loss values for the plurality of component carriers or frequency ranges and based at least in part on the physical uplink control channel resource configuration.

With respect to process 800, in a thirteenth aspect, alone or in combination with one or more of the first through twelfth aspects, the user equipment is configured to determine a maximum transmit power for a transmission of the set of transmissions based at least in part on a transmit power command of the downlink control information message.

With respect to process 800, in a fourteenth aspect, alone or in combination with one or more of the first through thirteenth aspects, the user equipment is configured to determine a power offset value for a transmit power for a transmission of the set of transmissions based at least in part on a transmit power command of the downlink control information message.

With respect to process 800, in a fifteenth aspect, alone or in combination with one or more of the first through fourteenth aspects, a plurality of possible physical uplink control channel resource configurations associated with a common resource indicator are associated with a common physical uplink control channel repetition parameter.

With respect to process 800, in a sixteenth aspect, alone or in combination with one or more of the first through fifteenth aspects, the set of transmissions includes an acknowledgement message or a negative acknowledgement message. In some aspects, the user equipment is configured to drop transmission of an uplink control information message or reception of a physical downlink shared channel message colliding with at least one transmission of the set of transmissions to transmit the set of transmissions.

With respect to process 800, in a seventeenth aspect, alone or in combination with one or more of the first through sixteenth aspects, the downlink control information message includes a physical uplink control channel repetition parameter indicator to indicate the physical uplink control channel repetition parameter.

With respect to process 800, in an eighteenth aspect, alone or in combination with one or more of the first through seventeenth aspects, the downlink control information message is a downlink scheduling downlink control information message to schedule an acknowledgement message or a negative acknowledgement message.

With respect to process 800, in a nineteenth aspect, alone or in combination with one or more of the first through eighteenth aspects, the downlink control information message is a downlink scheduling downlink control information message or an uplink scheduling downlink control information message and is associated with triggering an aperiodic channel state information message.

With respect to process 800, in a twentieth aspect, alone or in combination with one or more of the first through nineteenth aspects, the physical uplink control channel resource configuration is indicated by a physical uplink control channel resource indicator field in the downlink control information message.

With respect to process 800, in a twenty first aspect, alone or in combination with one or more of the first through twentieth aspects, each physical uplink control channel resource configuration associated with a common value for the physical uplink control channel resource indicator field is associated with a common value for the physical uplink control channel repetition parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
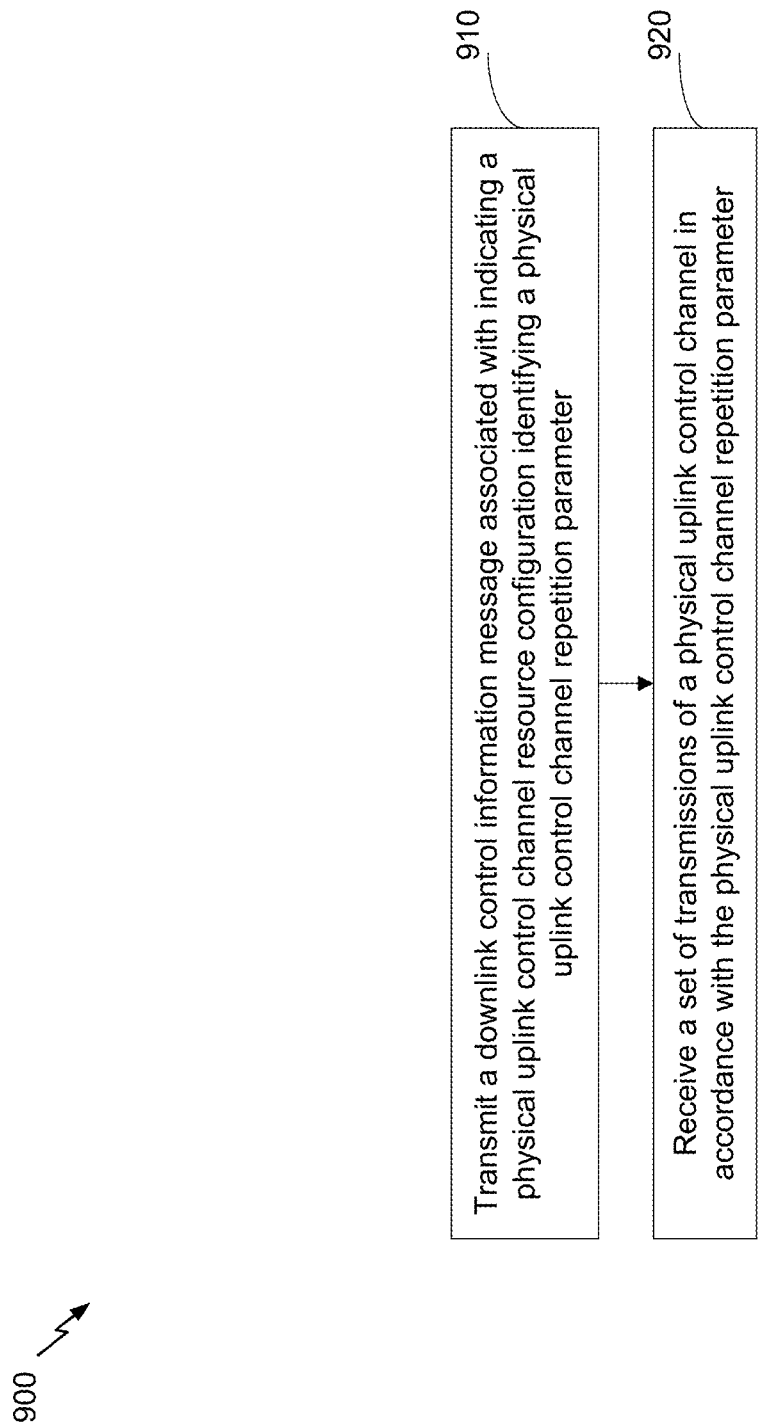
FIG. 9 is a diagram illustrating an example process performed, for example, by a base station, in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110 and/or the like) performs operations associated with physical uplink control channel repetition configuration.

As shown in FIG. 9, in some aspects, process 900 may include transmitting a downlink control information message associated with indicating a physical uplink control channel resource configuration identifying a physical uplink control channel repetition parameter (block 910). For example, the BS (e.g., using transmit processor 220, controller/processor 240, memory 242, and/or the like) may transmit a downlink control information message associated with indicating a physical uplink control channel resource configuration identifying a physical uplink control channel repetition parameter, as described above.

As further shown in FIG. 9, in some aspects, process 900 may include receiving a set of transmissions of a physical uplink control channel in accordance with the physical uplink control channel repetition parameter (block 920). For example, the BS (e.g., using receive processor 238, controller/processor 240, memory 242, and/or the like) may receive a set of transmissions of a physical uplink control channel in accordance with the physical uplink control channel repetition parameter, as described above.

Process 900 may include additional aspects, such as any single aspect or any combination of aspects described below and/or in connection with one or more other processes described elsewhere herein.

With respect to process 900, in a first aspect, the physical uplink control channel resource configuration includes the physical uplink control channel repetition parameter.

With respect to process 900, in a second aspect, alone or in combination with the first aspect, the physical uplink control channel resource configuration includes information identifying at least one of a time resource, a frequency resource, or a code domain resource.

With respect to process 900, in a third aspect, alone or in combination with one or more of the first and second aspects, the physical uplink control channel repetition parameter identifies a quantity of transmissions of the physical uplink control channel that the base station is to receive.

With respect to process 900, in a fourth aspect, alone or in combination with one or more of the first through third aspects, the base station is configured to receive the set of transmissions using a common resource set across a plurality of slots.

With respect to process 900, in a fifth aspect, alone or in combination with one or more of the first through fourth aspects, the base station is configured to receive the set of transmissions using a first resource set in a first slot and a second resource set that is different from the first resource set in a second slot.

With respect to process 900, in a sixth aspect, alone or in combination with one or more of the first through fifth aspects, the physical uplink control channel resource configuration identifies a power indicator.

With respect to process 900, in a seventh aspect, alone or in combination with one or more of the first through sixth aspects, the power indicator indicates that a user equipment is to use a maximum power or apply a power increase to a determined power.

With respect to process 900, in an eighth aspect, alone or in combination with one or more of the first through seventh aspects, the power indicator relates to the set of transmissions and not to one or more subsequent transmissions signaled by another downlink control information message.

With respect to process 900, in a ninth aspect, alone or in combination with one or more of the first through eighth aspects, the power indicator is conveyed based at least in part on the downlink control information message.

With respect to process 900, in a tenth aspect, alone or in combination with one or more of the first through ninth aspects, a first transmission, of the set of transmissions, is associated with a first component carrier or frequency range and a second transmission, of the set of transmissions, is associated with a second component carrier or frequency range that is different than the first component carrier or frequency range.

With respect to process 900, in an eleventh aspect, alone or in combination with one or more of the first through tenth aspects, a transmit power command included in the downlink control information message identifies a plurality of transmit powers for a plurality of component carriers or frequency ranges for the set of transmissions.

With respect to process 900, in a twelfth aspect, alone or in combination with one or more of the first through eleventh aspects, the physical uplink control channel resource configuration includes information identifying the plurality of transmit powers or a plurality of path loss values for the plurality of component carriers or frequency ranges.

With respect to process 900, in a thirteenth aspect, alone or in combination with one or more of the first through twelfth aspects, a transmit power command of the downlink control information message identifies a maximum transmit power for a transmission of the set of transmissions.

With respect to process 900, in a fourteenth aspect, alone or in combination with one or more of the first through thirteenth aspects, a transmit power command of the downlink control information message identifies a power offset value for a transmit power for a transmission of the set of transmissions.

With respect to process 900, in a fifteenth aspect, alone or in combination with one or more of the first through fourteenth aspects, a plurality of possible physical uplink control channel resource configurations associated with a common resource indicator are associated with a common physical uplink control channel repetition parameter.

With respect to process 900, in a sixteenth aspect, alone or in combination with one or more of the first through fifteenth aspects, the set of transmissions includes an acknowledgement message or a negative acknowledgement message.

With respect to process 900, in a seventeenth aspect, alone or in combination with one or more of the first through sixteenth aspects, the downlink control information message includes a physical uplink control channel repetition parameter indicator to indicate the physical uplink control channel repetition parameter.

With respect to process 900, in an eighteenth aspect, alone or in combination with one or more of the first through seventeenth aspects, the downlink control information message is a downlink scheduling downlink control information message to schedule an acknowledgement message or a negative acknowledgement message.

With respect to process 900, in a nineteenth aspect, alone or in combination with one or more of the first through eighteenth aspects, the downlink control information message is a downlink scheduling downlink control information message or an uplink scheduling downlink control information message and is associated with triggering an aperiodic channel state information message.

With respect to process 900, in a twentieth aspect, alone or in combination with one or more of the first through nineteenth aspects, the physical uplink control channel resource configuration is indicated by a physical uplink control channel resource indicator field in the downlink control information message.

With respect to process 900, in a twenty-first aspect, alone or in combination with one or more of the first through twentieth aspects, each physical uplink control channel resource configuration associated with a common value for the physical uplink control channel resource indicator field are associated with a common value for the physical uplink control channel repetition parameter.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
    determining, based at least in part on a signal associated with indicating a physical uplink control channel resource configuration identifying a plurality of physical uplink control channel repetition parameters associated with a plurality of physical uplink control channel resources, a physical uplink control channel resource of the plurality of physical uplink control channel resources;
    identifying, based at least in part on the physical uplink control channel resource, a physical uplink control channel repetition parameter, of the plurality of physical uplink control channel repetition parameters, associated with the physical uplink control channel resource; and
    transmitting a set of transmissions of a physical uplink control channel based at least in part on the physical uplink control channel repetition parameter.

2. The method of claim 1, further comprising:
receiving an indication that indicates an association between first physical uplink control channel resources, of the plurality of physical uplink control channel resources, and second physical uplink control channel resources of the plurality of physical uplink control channel resources; and
wherein transmitting the set of transmissions comprises:
transmitting one or more first transmissions using the first physical uplink control channel resources and one or more second transmissions using the second physical uplink control channel resources based at least in part on a second signal identifying the first physical uplink control channel resources and not the second physical uplink control channel resources.

3. The method of claim 1, wherein the physical uplink control channel repetition parameter identifies a quantity of transmissions of the physical uplink control channel that the user equipment is to transmit.

4. The method of claim 1, wherein the user equipment is configured to transmit the set of transmissions using a common resource set across a plurality of slots, or
wherein the user equipment is configured to transmit the set of transmissions using a first resource set in a first slot and a second resource set that is different from the first resource set in a second slot.

5. The method of claim 1, wherein the user equipment is configured to determine a power indicator based at least in part on the physical uplink control channel resource configuration.

6. The method of claim 5, wherein the power indicator indicates that the user equipment is to use a maximum power or apply a power increase to a determined power.

7. The method of claim 5, wherein the power indicator relates to the set of transmissions and not to one or more subsequent transmissions indicated by another signal.

8. The method of claim 5, wherein the power indicator is determined based at least in part on the signal.

9. The method of claim 1, wherein a first transmission, of the set of transmissions, is associated with a first component carrier or frequency range and a second transmission, of the set of transmissions, is associated with a second component carrier or frequency range that is different than the first component carrier or frequency range.

10. The method of claim 9, wherein the user equipment is configured to determine a plurality of transmit powers for a plurality of component carriers or frequency ranges for the set of transmissions based at least in part on a transmit power command included in the signal.

11. The method of claim 10, wherein the user equipment is configured to determine the plurality of transmit powers based at least in part on a plurality of path loss values for the plurality of component carriers or frequency ranges and based at least in part on the physical uplink control channel resource configuration.

12. The method of claim 1, wherein the user equipment is configured to determine a maximum transmit power for a transmission of the set of transmissions based at least in part on a transmit power command of the signal, or
wherein the user equipment is configured to determine a power offset value for a transmit power for a transmission of the set of transmissions based at least in part on a transmit power command of the signal.

13. The method of claim 1, wherein the set of transmissions includes an acknowledgement message or a negative acknowledgement message; and
wherein the user equipment is configured to drop transmission of an uplink control information message or reception of a physical downlink shared channel message colliding with at least one transmission of the set of transmissions to transmit the set of transmissions.

14. The method of claim 1, wherein the signal includes a physical uplink control channel repetition parameter indicator to indicate the physical uplink control channel repetition parameter,
wherein the signal is to schedule an acknowledgement message or a negative acknowledgement message, or
wherein the signal is associated with triggering an aperiodic channel state information message.

15. The method of claim 1, wherein the physical uplink control channel resource configuration is indicated by a physical uplink control channel resource indicator field in the signal.

16. The method of claim 15, wherein each physical uplink control channel resource configuration associated with a common value for the physical uplink control channel resource indicator field are associated with a common value for the physical uplink control channel repetition parameter.

17. The method of claim 1, further comprising:
receiving a second signal associated with configuring one or more particular physical uplink control channel repetition parameters of the plurality of physical uplink control channel repetition parameters,
wherein identifying the physical uplink control channel repetition parameter is further based at least in part on the second signal.

18. The method of claim 1, wherein determining the physical uplink control channel resource comprises:
determining, based at least in part on a physical uplink control channel bit indicator included in the signal, the physical uplink control channel resource.

19. The method of claim 1, wherein the plurality of physical uplink control channel repetition parameters further includes a second physical uplink control channel repetition parameter associated with a second physical uplink control channel resource of the plurality of physical uplink control channel resources.

20. The method of claim 1, wherein the signal comprises a downlink control indication message.

21. A method of wireless communication performed by a base station, comprising:
transmitting a signal associated with indicating a physical uplink control channel resource configuration identifying a plurality of physical uplink control channel repetition parameters, including a physical uplink control channel repetition parameter, associated with a plurality of physical uplink control channel resources including a physical uplink control channel resource associated with the physical uplink control channel repetition parameter; and
receiving a set of transmissions of a physical uplink control channel in accordance with the physical uplink control channel repetition parameter.

22. The method of claim 21, wherein the physical uplink control channel resource configuration includes information identifying at least one of a time resource, a frequency resource, or a code domain resource.

23. The method of claim 21, wherein the physical uplink control channel repetition parameter identifies a quantity of transmissions of the physical uplink control channel that the base station is to receive.

24. The method of claim 21, wherein the base station is configured to receive the set of transmissions using a common resource set across a plurality of slots, or
   wherein the base station is configured to receive the set of transmissions using a first resource set in a first slot and a second resource set that is different from the first resource set in a second slot.

25. The method of claim 21, wherein the physical uplink control channel resource configuration identifies a power indicator.

26. The method of claim 25, wherein the power indicator indicates that a user equipment is to use a maximum power or apply a power increase to a determined power.

27. The method of claim 25, wherein the power indicator relates to the set of transmissions and not to one or more subsequent transmissions indicated by another signal.

28. The method of claim 25, wherein the power indicator is conveyed based at least in part on the signal.

29. The method of claim 21, wherein a first transmission, of the set of transmissions, is associated with a first component carrier or frequency range and a second transmission, of the set of transmissions, is associated with a second component carrier or frequency range that is different than the first component carrier or frequency range.

30. The method of claim 29, wherein a transmit power command included in the signal identifies a plurality of transmit powers for a plurality of component carriers or frequency ranges for the set of transmissions.

31. The method of claim 30, wherein the physical uplink control channel resource configuration includes information identifying the plurality of transmit powers or a plurality of path loss values for the plurality of component carriers or frequency ranges.

32. The method of claim 21, wherein a transmit power command of the signal identifies a maximum transmit power for a transmission of the set of transmissions.

33. The method of claim 21, wherein a transmit power command of the signal identifies a power offset value for a transmit power for a transmission of the set of transmissions.

34. The method of claim 21, wherein the set of transmissions includes an acknowledgement message or a negative acknowledgement message.

35. The method of claim 21, wherein the signal includes a physical uplink control channel repetition parameter indicator to indicate the physical uplink control channel repetition parameter,
   wherein the signal is to schedule an acknowledgement message or a negative acknowledgement message, or
   wherein the signal is associated with triggering an aperiodic channel state information message.

36. The method of claim 21, wherein the physical uplink control channel resource configuration is indicated by a physical uplink control channel resource indicator field in the signal.

37. The method of claim 36, wherein each physical uplink control channel resource configuration associated with a common value for the physical uplink control channel resource indicator field are associated with a common value for the physical uplink control channel repetition parameter.

38. The method of claim 21, wherein the signal comprises a downlink control indication message.

39. A user equipment for wireless communication, comprising:
   a memory; and
   one or more processors coupled to the memory, the one or more processors configured to:
      determine, based at least in part on a signal associated with indicating a physical uplink control channel resource configuration identifying a plurality of physical uplink control channel repetition parameters associated with a plurality of physical uplink control channel resources, a physical uplink control channel resource of the plurality of physical uplink control channel resources;
      identify, based at least in part on the physical uplink control channel resource, a physical uplink control channel repetition parameter, of the plurality of physical uplink control channel repetition parameters, associated with the physical uplink control channel resource; and
      transmit a set of transmissions of a physical uplink control channel based at least in part on the physical uplink control channel repetition parameter.

40. The user equipment of claim 39, wherein the physical uplink control channel resource configuration includes information identifying at least one of a time resource, a frequency resource, or a code domain resource.

41. The user equipment of claim 39, wherein the physical uplink control channel repetition parameter identifies a quantity of transmissions of the physical uplink control channel that the user equipment is to transmit.

42. The user equipment of claim 39, wherein the one or more processors are further configured to:
   receive a second signal associated with configuring one or more particular physical uplink control channel repetition parameters of the plurality of physical uplink control channel repetition parameters,
      wherein the one or more processors, to identify the physical uplink control channel repetition parameter, are configured to:
         identify, based at least in part on the second signal and the plurality of physical uplink control channel repetition parameters, the physical uplink control channel repetition parameter.

43. The user equipment of claim 42, wherein the plurality of physical uplink control channel repetition parameters further includes a second physical uplink control channel repetition parameter associated with a second physical uplink control channel resource of the plurality of physical uplink control channel resources.

44. The user equipment of claim 43, wherein the physical uplink control channel repetition parameter is different from the second physical uplink control channel repetition parameter.

45. The user equipment of claim 39, wherein the one or more processors, to determine the physical uplink control channel resource, are configured to:
   determine, based at least in part on a physical uplink control channel bit indicator included in the signal, the physical uplink control channel resource.

46. The user equipment of claim 39, wherein the signal comprises a downlink control indication message.

47. A base station for wireless communication, comprising:
   a memory; and
   one or more processors coupled to the memory, the memory and the one or more processors configured to:
      transmit a signal associated with indicating a physical uplink control channel resource configuration identifying a plurality of physical uplink control channel repetition parameters, including a physical uplink control channel repetition parameter, associated with a plurality of physical uplink control channel resources including a physical uplink control channel resource associated with the physical uplink control channel repetition parameter; and receive a set of transmissions of a physical uplink control channel in accordance with the physical uplink control channel repetition parameter.

48. The base station of claim 47, wherein the signal comprises a downlink control indication message.

* * * * *